United States Patent
Park et al.

(10) Patent No.: US 12,466,299 B2
(45) Date of Patent: Nov. 11, 2025

(54) GAP PREVENTION STRUCTURE OF SEAT RAIL FOR VEHICLE

(71) Applicant: DAS CO., LTD, Gyeongsangbuk-do (KR)

(72) Inventors: Jin Gu Park, Ulsan (KR); Jae Chul Jung, Ulsan (KR); Hyun Gyu Jo, Ulsan (KR)

(73) Assignee: DAS CO., LTD (KR)

( * ) Notice: Subject to any disclaimer, the term of this patent is extended or adjusted under 35 U.S.C. 154(b) by 195 days.

(21) Appl. No.: 18/470,412

(22) Filed: Sep. 19, 2023

(65) Prior Publication Data
US 2024/0101011 A1 Mar. 28, 2024

(30) Foreign Application Priority Data
Sep. 26, 2022 (KR) .................. 10-2022-0121687

(51) Int. Cl.
*B60N 2/07* (2006.01)
*B60N 2/90* (2018.01)
*B60N 2/08* (2006.01)

(52) U.S. Cl.
CPC .............. *B60N 2/90* (2018.02); *B60N 2/0707* (2013.01); *B60N 2/0715* (2013.01); *B60N 2/0818* (2013.01); *B60N 2/0837* (2013.01); *B60N 2/0868* (2013.01)

(58) Field of Classification Search
CPC .. B60N 2/0818; B60N 2/0715; B60N 2/0707; B60N 2/0705; B60N 2/90; B60N 2/0806; B60N 2/0868; B60N 2/0862; B60N 2/0837
See application file for complete search history.

(56) References Cited

U.S. PATENT DOCUMENTS

| | | | | |
|---|---|---|---|---|
| 5,348,261 A | * | 9/1994 | Nini ..................... | B60N 2/0825 248/424 |
| 8,668,180 B2 | * | 3/2014 | Shiraki ............... | B60N 2/0843 296/65.13 |
| 10,391,891 B2 | * | 8/2019 | Shiraki ............... | B60N 2/0843 |
| 10,994,634 B2 | * | 5/2021 | Zhang ................. | B60N 2/0875 |
| 11,345,259 B2 | * | 5/2022 | Marini .................... | B60N 2/43 |
| 12,043,144 B2 | * | 7/2024 | Zhao ................... | B60N 2/02246 |

(Continued)

FOREIGN PATENT DOCUMENTS

JP    H10-100752 A    2/2024

OTHER PUBLICATIONS

Office Action in Japan Application No. 10 2023 209 379.0 dated Sep. 5, 2024, 5 pages.

*Primary Examiner* — Syed A Islam

(57) ABSTRACT

The present disclosure relates to a gap prevention structure of a seat rail for a vehicle. The gap prevention structure includes: a lower rail configured to be fixed to a bottom of a vehicle body and to have a receiving space formed therein; an upper rail configured to have at least a portion thereof received in the receiving space and to slide in a longitudinal direction of the lower rail; a rolling bearing configured to be rotatably coupled to the upper rail and to roll and move in the receiving space in the longitudinal direction of the lower rail; and a gap prevention unit configured to limit rotation of the rolling bearing by pressing the rolling bearing while being inserted between the lower rail and the rolling bearing.

8 Claims, 6 Drawing Sheets

(56) References Cited

U.S. PATENT DOCUMENTS

| | | | |
|---|---|---|---|
| 2011/0089306 A1* | 4/2011 | Yamada | B60N 2/0843 |
| | | | 248/430 |
| 2013/0020459 A1* | 1/2013 | Moriyama | B60N 2/0722 |
| | | | 248/636 |
| 2017/0144569 A1* | 5/2017 | Nakamura | B60N 2/07 |
| 2017/0368963 A1* | 12/2017 | Watanabe | B60N 2/0881 |
| 2019/0225116 A1 | 7/2019 | Zhang et al. | |

* cited by examiner

[Fig. 1]

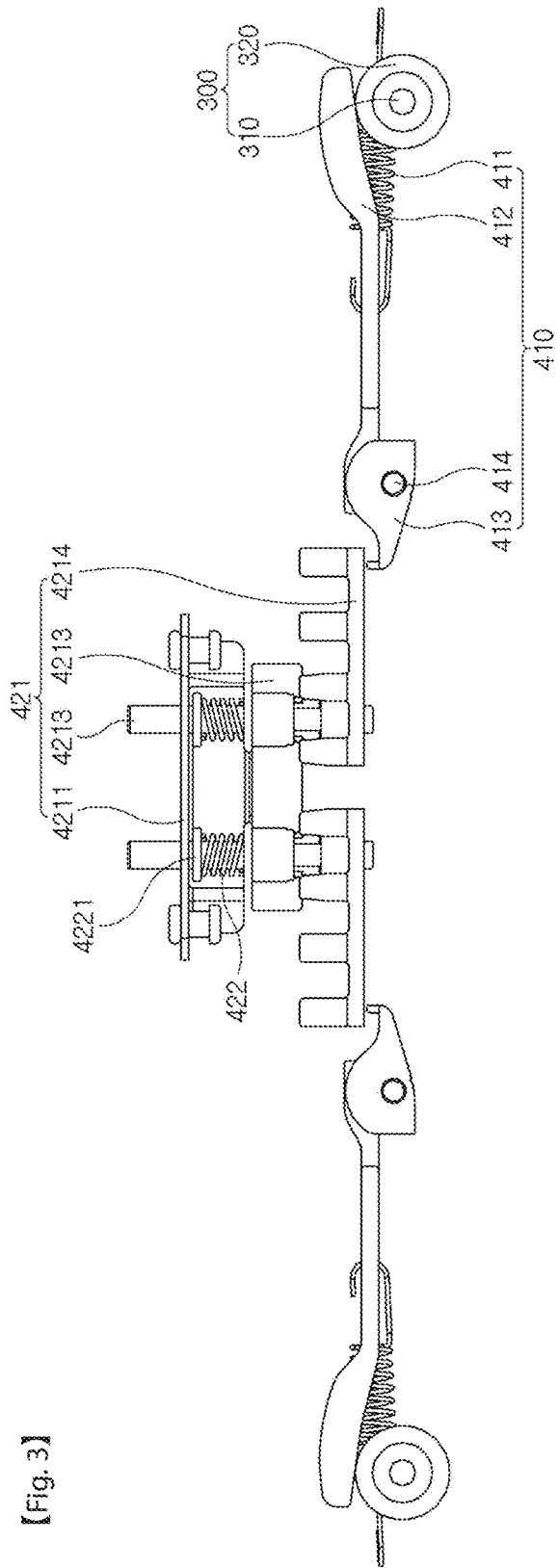
[Fig. 3]

[Fig. 4]
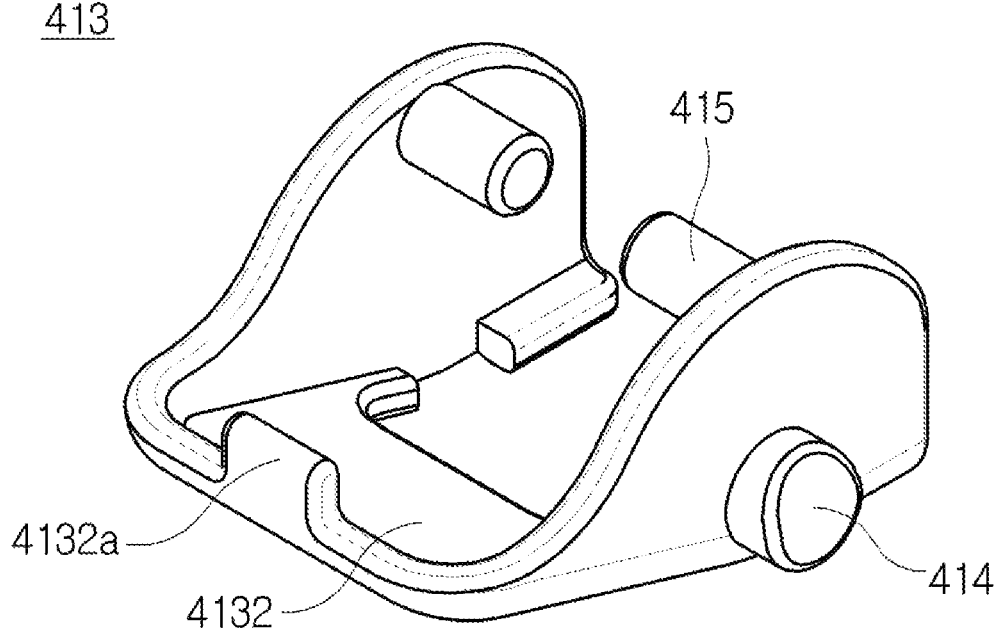

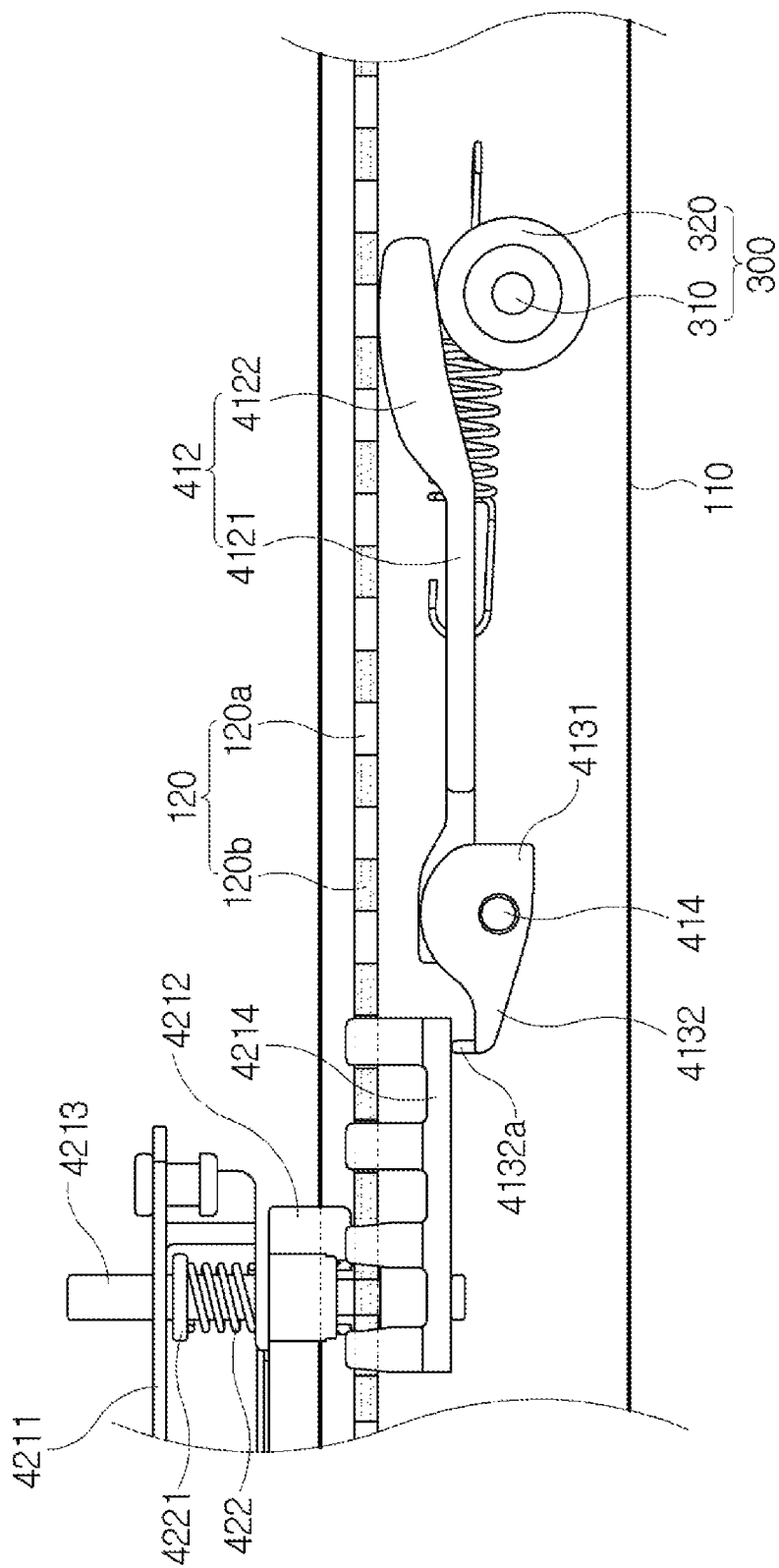
[Fig. 5a]

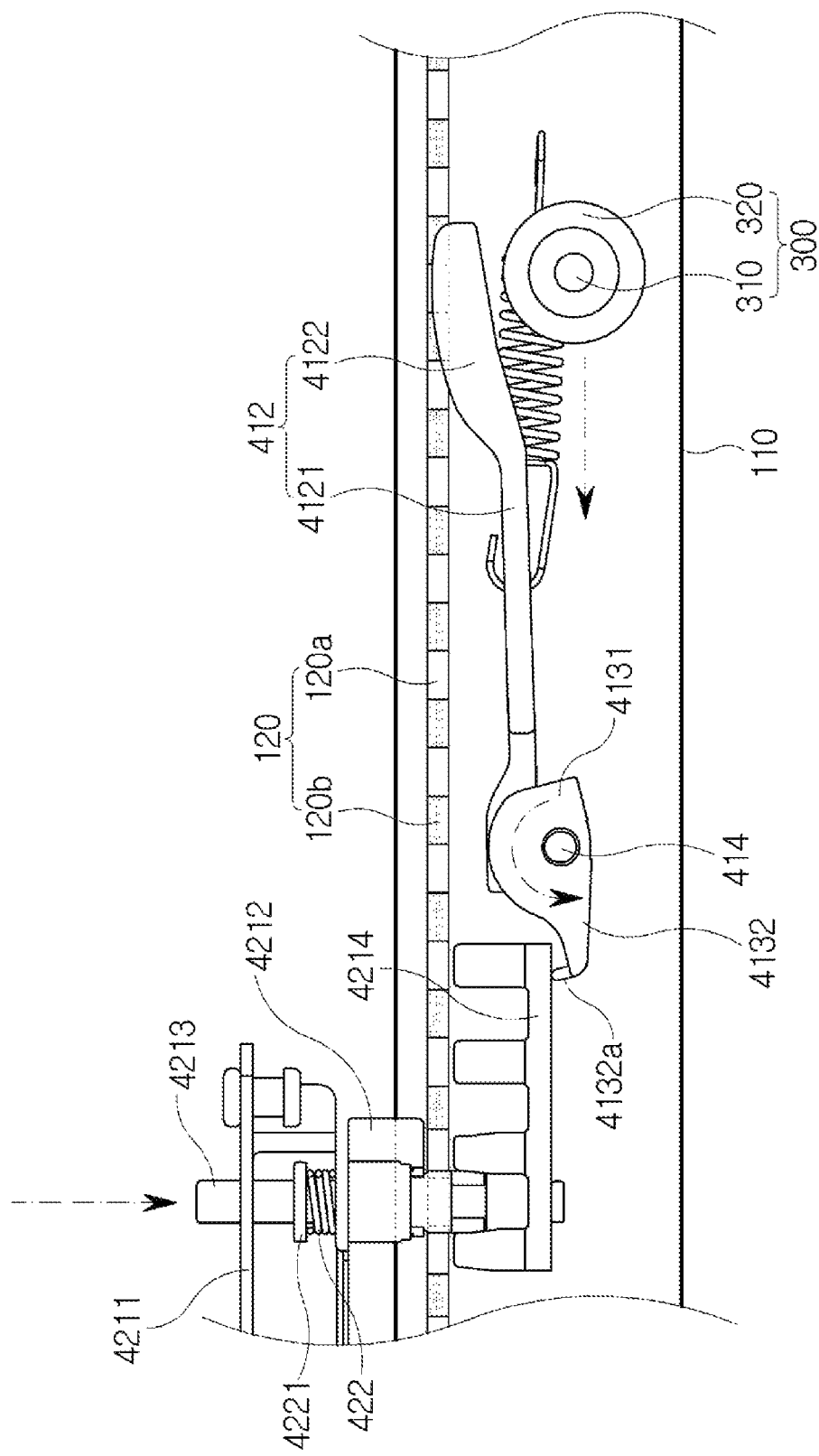
[Fig. 5b]

GAP PREVENTION STRUCTURE OF SEAT RAIL FOR VEHICLE

CROSS-REFERENCE TO RELATED APPLICATIONS

The present application claims priority to Korean Patent Application No. 10-2022-0121687, filed Sep. 26, 2022, the entire contents of which is incorporated herein for all purposes by this reference.

FIELD

The present disclosure relates to a gap prevention structure of a seat rail for a vehicle.

BACKGROUND

In general, a vehicle seat is intended to maintain a passenger's riding posture in an optimal state, and includes a seatback supporting the upper body of the passenger and a seat cushion supporting the lower body of the passenger such as the buttocks and thighs.

Also, the vehicle seat is installed to slidably move a certain section in the forward and backward direction of the vehicle body in order to fit the body shape of the passenger and to efficiently use the interior space.

Here, the seat rail generally includes a lower rail and an upper rail. The lower rail is fixedly installed in the longitudinal direction of the vehicle body with respect to a floor panel corresponding to a floor surface of the interior of the vehicle. The upper rail is installed on and coupled to a rolling bearing in such a way as to slidably move along the lower rail and is fixed to a lower portion of the seat cushion.

In this case, the upper rail is configured such that it moves a certain section along the lower rail and then the fixed position of the upper rail is limited to the position to which the upper rail has moved. To this end, the seat rail is provided with a locking device for locking the position of the upper rail with respect to the lower rail.

However, a conventional seat rail has a problem that the seat is shaken due to an irregular gap between the lower rail and the upper rail in a state where the position of the upper rail is fixed by the locking device.

For the purpose of solving such a problem, it is necessary to remove gap the between the lower rail and the upper rail and the shaking of the seat rail due to the gap by inserting upper and lower bearings shaft-fixed to the upper rail between the lower rails. However, a conventional seat rail has a structure in which an operating force for sliding the upper rail and the gap are changed respectively for each sliding section according to a manufacturing distribution. Since it is difficult to obtain a uniform quality when manufacturing a seat rail for a vehicle, there is a demand for the development of a technology for solving the problem.

PRIOR ART DOCUMENT

Patent Document (Patent Document 0001) Korean Registered Patent Publication No. 10-1643889

SUMMARY

The present invention is proposed to solve the above problems and is designed to remove an irregular gap between the lower rail and the upper rail to which the rolling bearing is connected, by inserting and fixing a gap prevention unit between the lower rail and the rolling bearing.

Also, the present invention is designed to limit the rotation of the rolling bearing by pressing the rolling bearing that rolls and moves inside the lower rail when the seat rail is locked, and to allow the rolling bearing to freely roll and move by spacing the gap prevention unit apart from the rolling bearing when the locking of the seat rail is released, so that an irregular gap between the lower rail and the upper rail to which the rolling bearing is connected is selectively removed.

One embodiment is a gap prevention structure of a seat rail for a vehicle. The gap prevention structure may include: a lower rail configured to be fixed to a bottom of a vehicle body and to have a receiving space formed therein; an upper rail configured to have at least a portion thereof received in the receiving space and to slide in a longitudinal direction of the lower rail; a rolling bearing configured to be rotatably coupled to the upper rail and to roll and move in the receiving space in the longitudinal direction of the lower rail; and a gap prevention unit configured to limit rotation of the rolling bearing by pressing the rolling bearing while being inserted between the lower rail and the rolling bearing.

The gap prevention unit may include: an elastic moving part configured to elastically move in the longitudinal direction of the lower rail by an elastic force of a first spring that is inserted into one side of the upper rail; and a fixed operating unit configured to have at least a portion thereof disposed in the receiving space and to press the rolling bearing by an elastic restoring force of the elastic moving part.

The first spring may apply the elastic restoring force in a direction in which the elastic moving part approaches the rolling bearing.

The elastic moving part may include: a damper configured to be connected to the first spring and to press the rolling bearing in a state in which the first spring is elastically restored; and a lever configured to be coupled to a fixed rotating shaft hinge-coupled to the upper rail and be rotatable about the fixed rotating shaft, and configured to be coupled to a moving rotating shaft hinge-coupled to the damper and be rotatable about the moving rotating shaft.

The fixed rotating shaft and the moving rotating shaft may be formed side by side with each other.

The upper rail may include a guide hole that guides elastic movement of the damper.

The fixed operating unit include: a fixed guide configured to rotate the lever eccentrically about the fixed rotating shaft by pressing one side of the lever; and a second spring configured to apply an elastic restoring force in a direction in which the fixed guide gets farther away from the lever.

The lever may include: a pair of side portions configured to have the fixed rotating shaft and the moving rotating shaft formed therein; and a connection portion configured to be disposed between the pair of side portions and to have at least a portion thereof formed to be bent in a direction closer to the fixed guide.

Advantageous Effects

As described above, the gap prevention structure of a seat rail for a vehicle according to the embodiment of the present disclosure has an effect of removing an irregular gap between the lower rail and the upper rail to which the rolling bearing is connected, by inserting and fixing the gap prevention unit between the lower rail and the rolling bearing.

Also, the gap prevention structure has an effect of limiting the rotation of the rolling bearing by pressing the rolling bearing that rolls and moves inside the lower rail when the seat rail is locked, and of allowing the rolling bearing to freely roll and move by spacing the gap prevention unit apart from the rolling bearing when the locking of the seat rail is released, so that an irregular gap between the lower rail and the upper rail to which the rolling bearing is connected is selectively removed.

BRIEF DESCRIPTION OF THE DRAWINGS

FIG. 3 is a front view for describing the gap prevention unit in the gap prevention structure of the seat rail for a vehicle according to the embodiment of the present disclosure;

FIG. 4 is a perspective view for describing a lever in the gap prevention structure of the seat rail for a vehicle according to the embodiment of the present disclosure;

FIG. 5A is a view for describing a state where the gap prevention unit is caught between a lower rail and a rolling bearing in the gap prevention structure of the seat rail for a vehicle according to the embodiment of the present disclosure; and FIG. 5B is a view for describing a state where the gap prevention unit is separated between the lower rail and the rolling bearing in the gap prevention structure of the seat rail for a vehicle according to the embodiment of the present disclosure.

DETAILED DESCRIPTION

Figure 1:
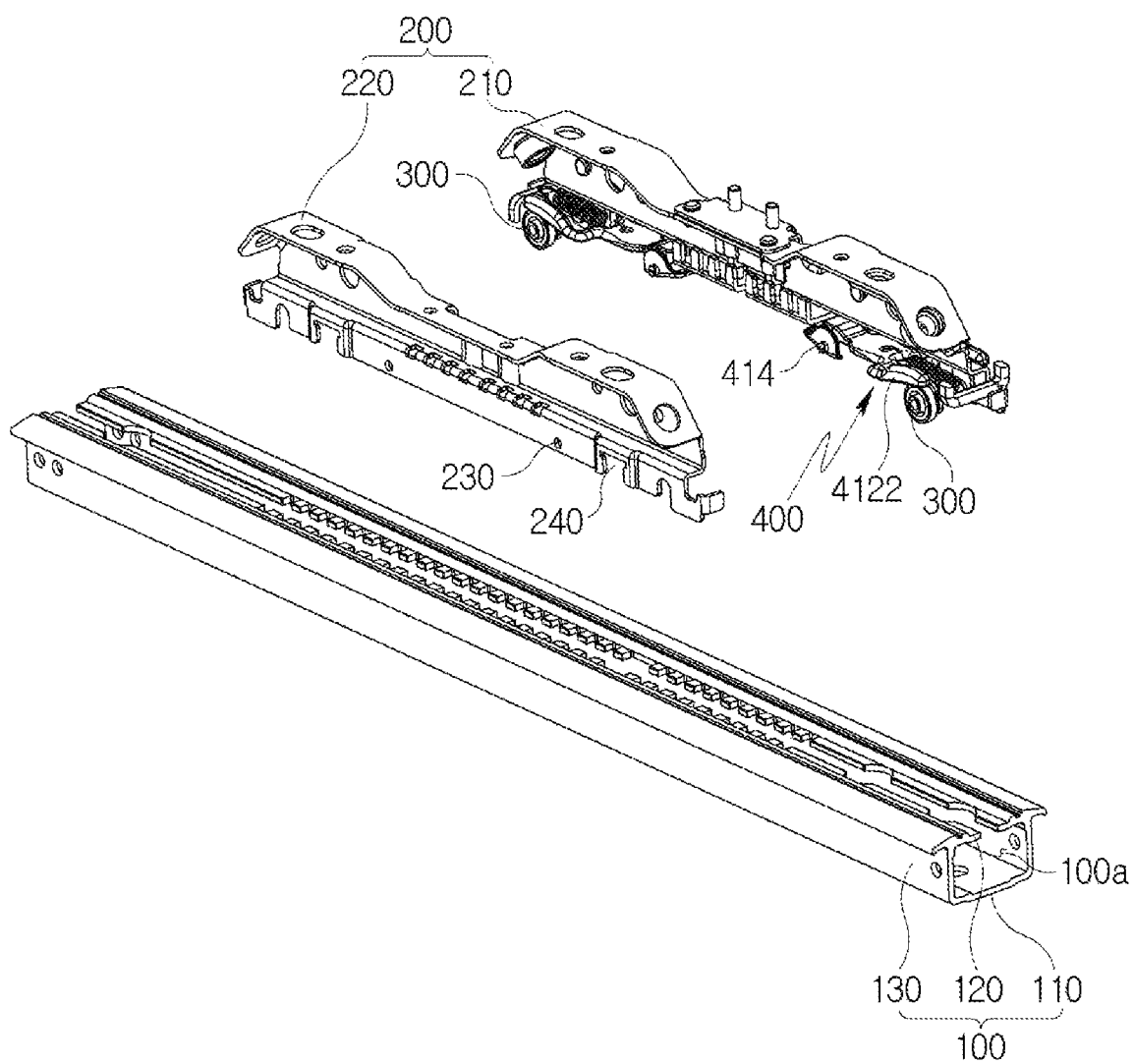
FIG. 1 is an exploded perspective view of a gap prevention structure of a seat rail for a vehicle according to an embodiment of the present disclosure.

Hereinafter, preferred embodiment of the present invention will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

Terms used in the present specification are provided for description of only specific embodiments of the present invention, and not intended to be limiting. An expression of a singular form includes the expression of plural form thereof unless otherwise explicitly mentioned in the context.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Hereinafter, specific embodiments of the present invention will be described with reference to the accompanying drawings.

FIG. 1 is an exploded perspective view of a gap prevention structure of a seat rail for a vehicle according to an embodiment of the present disclosure.

Referring to FIG. 1, the gap prevention structure of the seat rail for a vehicle according to an embodiment of the present disclosure may include a lower rail 100, an upper rail 200, a rolling bearing 300, and a gap prevention unit 400.

The lower rail 100 may be fixed to the bottom of a vehicle body and may have a receiving space 100a formed therein.

The lower rail 100 may include a first frame 110, a second frame 120, and a third frame 130. A pair of the second frames 120 may extend from an end of the first frame 110, and the third frame may extend from an end of each of the second frames.

The receiving space 100a may be formed within the lower rail 100 formed by the first frame 110, the second frame 120, and the third frame 130. Here, the rolling bearing 300 may roll and move in the longitudinal direction of the lower rail 100 through the receiving space 100a.

The first frame 110 may contact with the rolling bearing 300. Specifically, an inner surface of the first frame 110 may come into contact with a bearing member 320 of the rolling bearing 300. Here, the inner surface of the first frame 110 may face the second frame 120. Therefore, the rolling bearing 300 may roll and move in the longitudinal direction of the first frame 110 while being in contact with the inner surface of the first frame 110.

The second frame 120 may be disposed in parallel with the first frame 110. An inner surface of the second frame 120 may contact with a damper 412. Here, the inner surface of the second frame 120 may face the first frame 110. The second frame 120 may extend vertically from one end and the other end of the third frame 130 and may be provided in the form of a pair.

Specifically, the second frame 120 may include a through-hole 120a and a second frame member 120b. Here, when a first spring 411 and a second spring 422 are elastically restored, a portion of a pressing member 4214 to be described later is inserted and fixed into the through-hole 120a formed in the second frame member 120b. Simultaneously with this, the damper 412 may limit the rotation of the bearing member 320 by pressing the bearing member while being inserted between the second frame member 120b and the bearing member 320.

The third frame 130 may connect the first frame 110 and the second frame 120. The third frames 130 that extends from one end and the other end of the first frame 110 respectively may be disposed in the form of a pair such that the third frames face each other. The pair of third frames 130 may be formed to be bent vertically at both ends of the first frame 110. The first frame 110 and the second frame 120 may be formed side by side with the third frame 130 placed therebetween.

The upper rail 200 may slide in the longitudinal direction of the lower rail 100. At least a portion of the upper rail 200 may be received in the receiving space 100a of the lower rail 100.

The upper rail 200 may include a first rail member 210 and a second rail member 220.

The second rail member 220 may be coupled to the first rail member 210. A hinge hole 230 and a guide hole 240 may be formed in a side surface of the first rail member 210 and a side surface of the second rail member 220 that corresponds to the first rail member 210. Here, a fixed rotating shaft 414 of a lever 413 may be hinge-coupled to the hinge hole 230, and the guide hole 240 may guide elastic movement of the damper 412.

The rolling bearing 300 may be rotatably coupled to the upper rail 200 and may roll and move in the longitudinal direction of the lower rail 100.

The rolling bearing 300 may include a shaft 310 that is coupled to the upper rail 200 and a bearing member 320 that is axially coupled to the shaft 310 in such a manner as to rotate in accordance with the rotation of the shaft 310.

Figure 2:
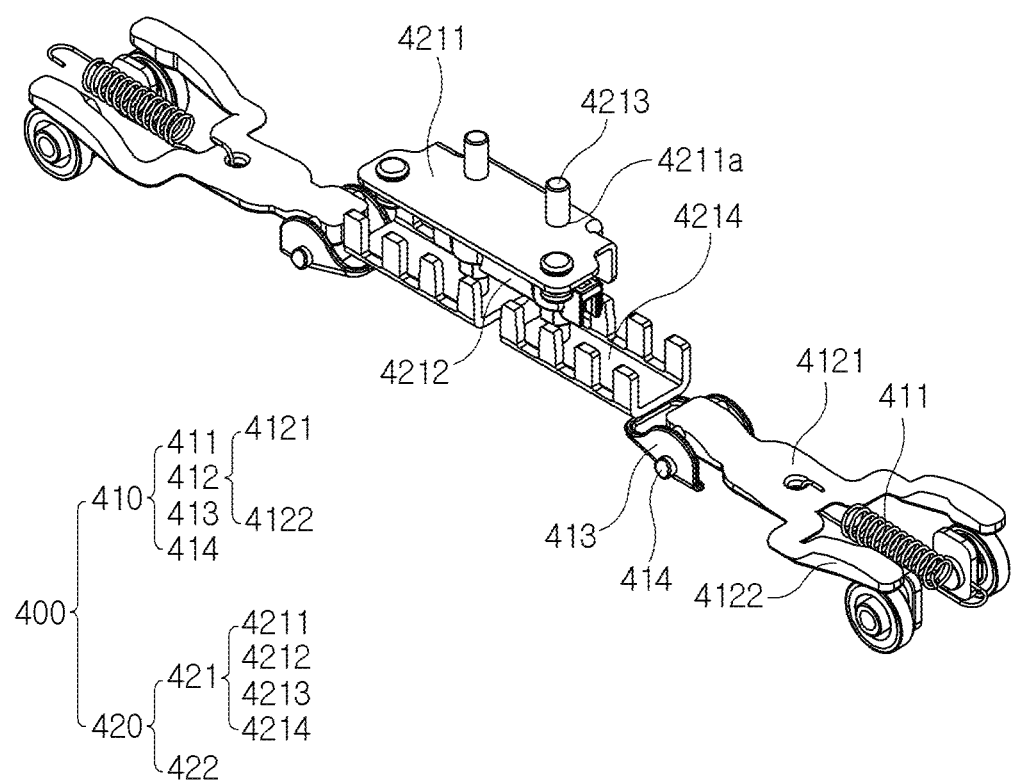
FIG. 2 is a perspective view for describing a gap prevention unit in the gap prevention structure of the seat rail for a vehicle according to the embodiment of the present disclosure.

FIG. 2 is a perspective view for describing the gap prevention unit in the gap prevention structure of the seat rail for a vehicle according to the embodiment of the present disclosure. FIG. 3 is a front view for describing the gap prevention unit in the gap prevention structure of the seat rail for a vehicle according to the embodiment of the present disclosure. FIG. 4 is a perspective view for describing the lever in the gap prevention structure of the seat rail for a vehicle according to the embodiment of the present disclosure.

The gap prevention unit 400 is disposed with being inserted between the lower rail 100 and the rolling bearing 300, thereby removing an irregular gap between the lower rail 100 and the upper rail 200 to which the rolling bearing 300 is connected.

The gap prevention unit 400 may limit the rotation of the rolling bearing 300 by pressing the rolling bearing 300 while being inserted between the lower rail 100 and the rolling bearing 300.

The gap prevention unit 400 may include an elastic moving part 410 and a fixed operating unit 420.

The elastic moving part 410 that elastically moves in the longitudinal direction of the lower rail 100 may include the damper 412 and the lever 413.

The elastic moving part 410 may elastically move in the longitudinal direction of the lower rail 100 by an elastic force of a first spring 411 that is inserted into one side of the upper rail 200.

One side end of the first spring 411 may be inserted into the upper rail 200 and the other side end of the first spring 411 may be inserted into the elastic moving part 410. Specifically, one side end of the first spring 411 may be inserted into the upper rail 200 and the other side end of the first spring 411 may be inserted into the damper 412.

The first spring 411 may apply an elastic restoring force in a direction in which the elastic moving part 410 approaches the rolling bearing 300. Specifically, the first spring 411 may apply an elastic restoring force in a direction in which the damper 412 approaches a space between the rolling bearing 300 and the second frame 120.

The damper 412 connected to the first spring 411 may press the rolling bearing 300 in a state in which the first spring 411 is elastically restored.

The damper 412 may include a main body 4121 and a side body 4122.

The first spring 411 may be inserted into one side of the main body 4121. The lever may be rotatably coupled to the other side of the main body 4121.

The side body 4122 may be formed in the form of a pair at both ends of the main body 4121 and may pass through the guide hole 240. In addition, the side body 4122 may have a bent central portion thereof such that one side of the side body 4122 is caught on the upper rail 200 when the first spring 411 is elastically restored by a predetermined distance or more.

The lever 413 may include a side portion 4131 and a connection portion 4132.

The lever 413 may be coupled to the fixed rotating shaft 414 hinge-coupled to the upper rail 200 and be rotatable about the fixed rotating shaft 414. The lever 413 may be coupled to a moving rotating shaft 415 hinge-coupled to the damper 412 and be rotatable about the moving rotating shaft 415. Here, the fixed rotating shaft 414 and the moving rotating shaft 415 may be provided on the side portion 4131 and may be formed side by side with each other.

When the first spring 411 elastically moves, the fixed rotating shaft 414 may rotate while being coupled to the hinge hole 230 of the upper rail 200. Simultaneously with this, the moving rotating shaft 415 may move in the longitudinal direction of the lower rail 100 in conjunction with the elastic movement of the first spring 411.

The side portion 4131 is formed in the form of a pair that is disposed at both ends of the damper 412, and may have the fixed rotating shaft 414 and the moving rotating shaft 415 formed therein.

The connection portion 4132 may be disposed between the pair of side portions 4131, and at least a portion of the connection portion may be formed to be bent in a direction closer to the fixed operating unit 420.

Specifically, at least a portion of the connection portion 4132 may be formed to be bent in a direction closer to a fixed guide 421. A protruding member 4132a may be formed at an end of the connection portion 4132 in a direction closer to the fixed guide 421.

The upper rail 200 may include the guide hole 240 for guiding the elastic movement of the damper 412, and the damper 412 may move in a straight line along the guide hole 240 of the upper rail 200.

At least a portion of the fixed operating unit 420 may be disposed in the receiving space 100a and may guide the elastic movement of the elastic moving part 410.

The fixed operating unit 420 may include the fixed guide 421 and the second spring 422. The fixed guide 421 rotates the lever 413 eccentrically about the fixed rotating shaft 414 by pressing one side of the lever 413. The second spring 422 applies an elastic restoring force in a direction in which the fixed guide 421 gets farther away from the lever 413.

The fixed guide 421 may include a mounting bracket 4211, a supporting member 4212, a fixing pin 4213, and a pressing member 4214.

The mounting bracket 4211 may be mounted on the top surface of the upper rail 200, and a plurality of fixing holes 4211a into which the fixing pin 4213 can be inserted may be formed in the length direction.

The second spring 422 may be provided along an outer circumferential surface of the fixing pin 4213. A stopper 4221 may be provided on the second spring 422. The stopper 4221 may be pushed up by an elastic restoring force. When the second spring 422 is elastically restored, the stopper 4221 comes into contact with the mounting bracket 4211, so that the tension of the second spring 422 may be limited.

When the second spring 422 is compressed, the lower portion of the second spring 422 can be supported by the supporting member 4212. A through-hole (not shown) through which the fixing pin 4213 can pass may be formed in one side of the supporting member 4212. The diameter of the through-hole may be larger than the diameter of the fixing pin 4213 and may be less than the diameter of the second spring 422.

The pressing member 4214 that comes into contact with the fixing pin 4213 when the fixing pin 4213 goes down may be provided below the supporting member 4212. When the second spring 422 is elastically restored, the pressing member 4214 may rise upward and be inserted into the through-hole 120a of the second frame 120. Specifically, the pressing member may include a pressure plate (not shown) and a protrusion (not shown). When the second spring 422 is compressed and the fixing pin 4213 goes down, the pressure plate comes into contact with the fixing pin 4213 and presses the protruding member 4132a. When the second spring 422 is elastically restored and the pressure plate rises, the protrusion is inserted into the through-hole 120a.

FIG. 5A is a view for describing a locking state in the gap prevention structure of the seat rail for a vehicle according to the embodiment of the present disclosure. FIG. 5B is a view for describing an unlocking state in the gap prevention structure of the seat rail for a vehicle according to the embodiment of the present disclosure.

Referring to FIG. 5A, when the second spring 422 is elastically restored in a state in which a force pressing the fixing pin 4213 is removed, the protruding member 4132a of the lever 413 may push the pressing member 4214 upward. That is, when the second spring 422 is elastically restored in a tension direction and the first spring 411 is elastically restored in a compression direction, the side body 4122 of the damper 412 is inserted between the second frame 120 and the rolling bearing 300, so that the rotation of the rolling bearing 300 may be limited.

On the other hand, referring to FIG. 5B, in a state where the second spring 422 is compressed by pressing the fixing pin 4213, the pressing member 4214 pushes the protruding member 4132a of the lever 413 downward, thereby rotating the lever 413. That is, when the second spring 422 is compressed and the first spring 411 is tensioned, the side body 4122 of the damper 412 comes out of the space between the second frame 120 and the rolling bearing 300.

As shown in FIG. 5B, when the first spring 411 is compressed by pressing the fixing pin 4213, the fixed rotating shaft 414 may rotate counterclockwise while being coupled to the hinge hole 230 of the upper rail 200. Simultaneously with this, the moving rotating shaft 415 is associated with the rotation of the fixed rotating shaft 414, so that the moving rotating shaft 415 can move in a direction in which the side body 4122 of the damper 412 comes out between the second frame member 120b and the bearing member 320.

Therefore, since the rotation of the rolling bearing 300 is not limited in the unlocked state, the rolling bearing 300 can roll and move in the longitudinal direction of the lower rail along the first frame 110.

Although the present invention has been described above by way of the specific embodiments, this is for describing the present invention in detail. The present invention is not limited thereto and it is clear that the present invention can be modified or improved within the spirit of the present invention by those of ordinary skill in the art.

All simple modifications or changes of the present invention fall within the scope of the present invention. The specific scope of protection of the present invention will be apparent by the appended claims.

REFERENCE NUMERALS

| | |
|---|---|
| 100: Lower Rail | 100a: Receiving Space |
| 110: First Frame | 120: Second Frame |
| 120a: Through-Hole | 120b: Second Frame Member |
| 130: Third Frame | 200: Upper Rail |
| 210: First Rail Member | 220: Second Rail Member |
| 230: Hinge Hole | 240: Guide Hole |
| 300: Rolling Bearing | 310: Shaft |
| 320: Bearing Member | 400: Gap Prevention Unit |
| 410: Elastic Moving Part | 411: First Spring |
| 412: Damper | 4121: Main Body |
| 4122: Side Body | 413: Lever |

-continued

REFERENCE NUMERALS

| | |
|---|---|
| 4131: Side Portion | 4132: Connection Portion |
| 4132a: Protruding Member | 414: Fixed Rotating Shaft |
| 415: Moving Rotating Shaft | 420: Fixed Operating Unit |
| 421: Fixed Guide | 4211: Mounting Bracket |
| 4211a: Fixing Hole | 4212: Supporting Member |
| 4213: Fixing Pin | 4214: Pressing Member |
| 422: Second Spring | 4221: Stopper |

What is claimed is:

1. A gap prevention structure of a seat rail for a vehicle, the gap prevention structure comprising:
    a lower rail configured to be fixed to a bottom of a vehicle body and to have a receiving space formed therein;
    an upper rail configured to have at least a portion thereof received in the receiving space and to slide in a longitudinal direction of the lower rail;
    a rolling bearing configured to be rotatably coupled to the upper rail and to roll and move in the receiving space in the longitudinal direction of the lower rail; and
    a gap prevention unit configured to limit rotation of the rolling bearing by pressing the rolling bearing while being inserted between the lower rail and the rolling bearing.

2. The gap prevention structure of a seat rail for a vehicle of claim 1, wherein the gap prevention unit comprises:
    an elastic moving part configured to elastically move in the longitudinal direction of the lower rail by an elastic force of a first spring that is inserted into one side of the upper rail; and
    a fixed operating unit configured to have at least a portion thereof disposed in the receiving space and to press the rolling bearing by an elastic restoring force of the elastic moving part.

3. The gap prevention structure of a seat rail for a vehicle of claim 2, wherein the first spring applies the elastic restoring force in a direction in which the elastic moving part approaches the rolling bearing.

4. The gap prevention structure of a seat rail for a vehicle of claim 2, wherein the elastic moving part comprises:
    a damper configured to be connected to the first spring and to press the rolling bearing in a state in which the first spring is elastically restored; and
    a lever configured to be coupled to a fixed rotating shaft hinge-coupled to the upper rail and be rotatable about the fixed rotating shaft, and configured to be coupled to a moving rotating shaft hinge-coupled to the damper and be rotatable about the moving rotating shaft.

5. The gap prevention structure of a seat rail for a vehicle of claim 4, wherein the fixed rotating shaft and the moving rotating shaft are formed side by side with each other.

6. The gap prevention structure of a seat rail for a vehicle of claim 4, wherein the upper rail comprises a guide hole that guides elastic movement of the damper.

7. The gap prevention structure of a seat rail for a vehicle of claim 4, wherein the fixed operating unit comprises:
    a fixed guide configured to rotate the lever eccentrically about the fixed rotating shaft by pressing one side of the lever; and
    a second spring configured to apply an elastic restoring force in a direction in which the fixed guide gets farther away from the lever.

8. The gap prevention structure of a seat rail for a vehicle of claim 7, wherein the lever comprises:

a pair of side portions configured to have the fixed rotating shaft and the moving rotating shaft formed therein; and a connection portion configured to be disposed between the pair of side portions and to have at least a portion thereof formed to be bent in a direction closer to the fixed guide.

\* \* \* \* \*